United States Patent [19]

Durot et al.

[11] Patent Number: 4,818,393
[45] Date of Patent: Apr. 4, 1989

[54] APPARATUS FOR THE ANAEROBIC TREATMENT OF WASTE WATER

[75] Inventors: Jean Durot, Villepreux; Roger Nicol, Issy les Moulineaux, both of France

[73] Assignee: Degremont, S.A., Rueil-Malmaison Cedex, France

[21] Appl. No.: 927,183

[22] Filed: Nov. 5, 1986

[30] Foreign Application Priority Data

Nov. 15, 1985 [FR] France ............... 85 16929

[51] Int. Cl.$^4$ ............................................. B01D 21/24
[52] U.S. Cl. .................................... 210/197; 210/262; 210/522
[58] Field of Search .............. 210/603, 197, 196, 253, 210/258, 261, 513, 522, 533

[56] References Cited

U.S. PATENT DOCUMENTS

| | | | |
|---|---|---|---|
| 3,807,563 | 4/1974 | Reid, Jr. ................... | 210/197 X |
| 4,356,269 | 10/1982 | Thomsen et al. ........... | 210/603 X |
| 4,372,856 | 2/1983 | Morrison ................... | 210/603 |
| 4,412,003 | 10/1983 | Evans ........................ | 210/197 X |
| 4,521,310 | 6/1985 | Casey ........................ | 210/197 X |
| 4,568,457 | 2/1986 | Sullivan ..................... | 210/603 X |
| 4,613,434 | 9/1986 | Määttä ....................... | 210/197 X |

FOREIGN PATENT DOCUMENTS

| | | |
|---|---|---|
| 0299590 | 8/1917 | Fed. Rep. of Germany . |
| 0401052 | 8/1924 | Fed. Rep. of Germany . |
| 1162158 | 4/1958 | France . |
| 1481154 | 4/1967 | France . |
| 0109312 | 3/1925 | Switzerland . |

Primary Examiner—Tom Wyse
Attorney, Agent, or Firm—Sandler & Greenblum

[57] ABSTRACT

An apparatus for the anaerobic treatment of waste water, including in a same closed enclosure, under a gas pressure, a fermentation zone and a decantation zone, with internal recycling of the slurries from the decantation zone to the fermentation zone, made of at least two attached identical cells in mutual communication. The two cells operate alternately and reciprocally as a fermentation cell and as a decantation cell. Each cell is fitted out, in order to be fed while it operates as a decantation cell, with a gas-lift transfer device with two branches, one of the branches opening into the cell which is attached to that where it is placed.

8 Claims, 2 Drawing Sheets

APPARATUS FOR THE ANAEROBIC TREATMENT OF WASTE WATER

BACKGROUND OF THE INVENTION

1. Field of the Invention

The present invention is directed to an apparatus for the anaerobic treatment of urban or industrial waste water, and particularly diluted effluents as well as effluents exhibiting a high degree of pollution and, preferably, effluents which are difficult to degrade.

The invention is specifically directed to anaerobic treatments wherein a degradation of the fermentation organic pollution is caused in a closed reaction vessel, called fermentor, in presence of methanogene bacteria, the slurries formed being left to decant in order to be recycled in the fermentor so as to provide therein a high concentration of purifying microorganisms. The slurries in excess are regularly extracted from the apparatus.

In order to practice such a treatment, it is important to design an apparatus in which the recycling of the slurries from the decantation vessel to the fermentor is carried out in a simple manner, and in which a sufficient separation of the slurries can be carried out despite the presence of the gas formed during the fermentation in the reaction vessel.

2. Discussion of Background and Material Information

The standard apparatus conventionally used for such purpose include a fermentor and a separated clarifying tank, the slurries being recycled from the clarifying tank to the fermentor by pumping. In order that the slurries can build up so as to be drawn-off, it is necessary that the clarifying tank be very deep, steeply inclined, and therefore bulky. Alternatively, the tank can be scraped by means of an immersed mechanical equipment which tends to cause corrosion. Moreover, such apparatus have the disadvantage of being difficult to cover up and therefore of causing odor problems. In addition, the heat losses due to the transfer of the slurries can be high and necessitate a re-warming of the slurries prior to their recycling to the fermentor. Notwithstanding, the stability and rapidity of the anaerobic digestion is better if the temperature of the slurries remains constant.

Apparatus in which the clarifying tank is integrated to the fermentor have already been described. If they mitigate some of the hereabove disadvantages, i.e., they are less bulky, do not risk emitting smells and eliminate the risk of thermal shock to the slurries, they are nevertheless complex in their construction and difficult to use when diluted effluents are involved with structures that cannot be sufficiently large. Moreover they necessitate the presence of gas separators integrated in the apparatus between the fermentation zone and the decantation zone, and they do not solve the degassing problem in the decantation vessel as such where the methanization is taking place.

SUMMARY OF THE INVENTION

The present invention remedies these disadvantages by allowing the fermentation and clarification to be carried out in the same closed enclosure, having a volume and a surface adapted to accommodate the treated effluent, with a transfer of the slurries from one zone to the other is performed by means of a system also causing moreover a degassing and possibly an oxygenation of the slurries resulting in a partial stoppage of the methanization prior to the introduction of the slurries in the decantation zone, thereby preventing the emission of gas in said zone.

The apparatus according to the invention, for the anaerobic treatment of waste water includes a pressurized fermentation zone and a pressurized decantation zone in the same enclosure, with internal recycling of the slurries from the decantation zone to the fermentation zone. The apparatus is characterized in that it is made of at least two attached identical cells, the two cells communicating with each other and operating alternately and reciprocally as a fermentation cell and as a decantation cell.

According to the invention, each cell, which includes conventional means for feeding the water to be treated, recovering the treated water, discharging the gas formed and the excess slurries, as well as a stirring system by injection of recycled gas, is fitted with a gas-lift transfer device, including two branches, one branch opening in the cell in which it is placed and the other branch being advantageously provided with a ventilating shaft so as to adapt the cell to function as a dectantion chamber.

Also according to the invention, the two attached cells are in mutual communication via a balancing piping for the recycling of the slurry.

According to another embodiment of the invention, the gas used for transfer purposes is air causing the oxygenation of the slurries, resulting in a partial stoppage of the methanization.

According to an preferred embodiment of the invention, the apparatus includes a compartment fitted with lamellae for further or additional decanting the previously decanted and/or treated water wherein the compartment is placed longitudinally between the two cells, in the upper portion of the apparatus, and fed alternately by one or the other of the cells, during the phase where the cell function as a decantation cell.

BRIEF DESCRIPTION OF THE DRAWINGS

The various features and advantages of the invention will become more apparent from the following description of two embodiments of the invention, presented only as non limiting examples. This description is made with reference to the accompanying drawings wherein.

DETAILED DESCRIPTION

Generally, the apparatus for the anaerobic treatment of waste water according to the invention is a closed reactor, maintained under a gas pressure including an enclosure A in which a median partition B defines two identical and attached tanks, channels or cells 1, 1a, operating alternately and reciprocally as a fermentation cell and as a decantation cell.

Figure 1:
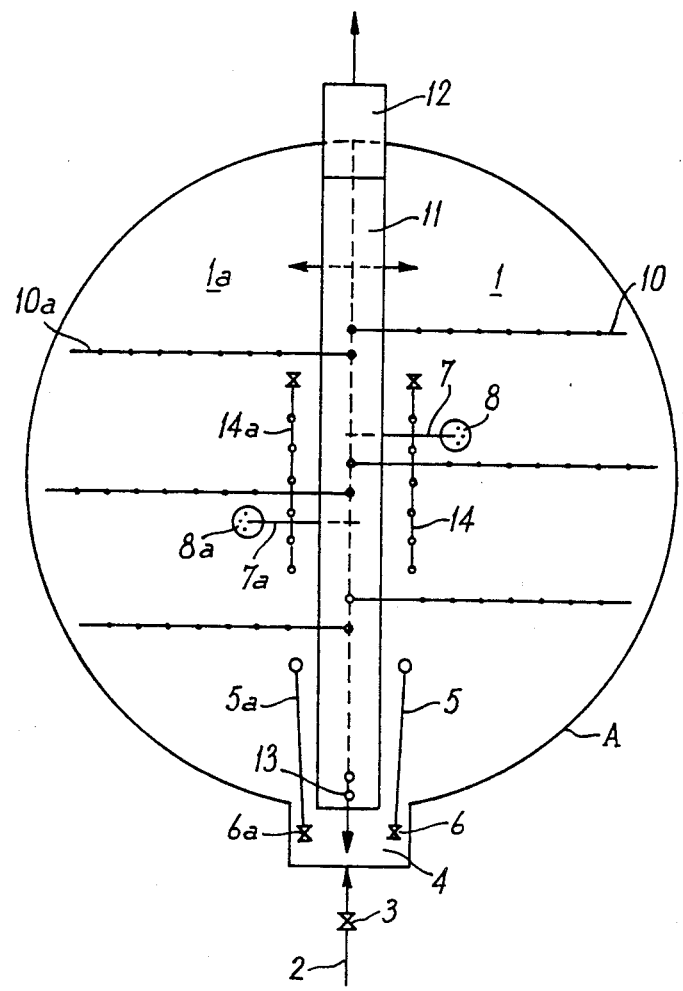
FIG. 1 is a systematic diagram of the apparatus according to the invention, as viewed from above.

Referring first to FIG. 1, the feeding with water to be treated in the two cells is made via a conduit 2 fitted with a control valve 3 or with a pump leading to a distribution trough 4 placed in the open air and in communication with each cell via ducts 5, 5a equipped with a control valve 6, 6a.

Each cell is fitted with a gas-lift transfer device 7, 7a, of constant flow rate and with two branches one, of which opens into the cell attached in which the branch is placed and which is provided with a ventilation shaft 8, 8a.

Cells 1 and 1a are in mutual communication at their base, via a balancing conduit 9.

Each cell also includes at its upper portion at least one embedded perforated manifold 10, 10a, ending in a central collection gutter 11 and an outlet overfall or weir 12 for the treated water. Each manifold 10, 10a is connected to a draining system 13, by a gas-lift or an immersed pump, placed in gutter 11.

Moreover, cells 1, 1a include injection blowpipes 14, 14a for the stirring gas, an output duct 15, 15a for the slurries in excess and a discharge duct 16, 16a for the gases formed.

Figure 3:
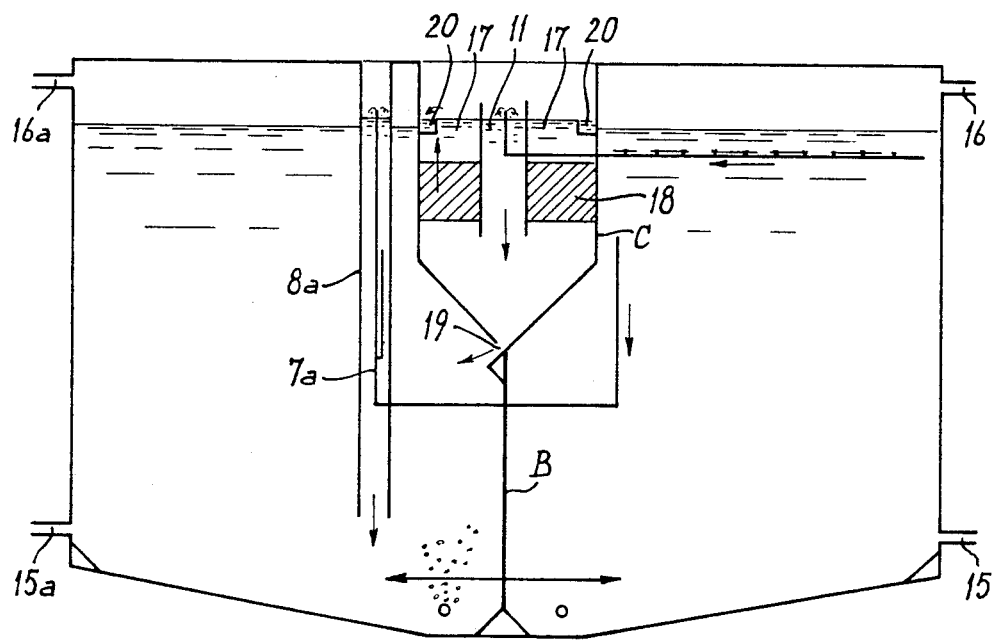

FIG. 3 shows an alternative embodiment of the apparatus according to the invention in which the manifolds 10, 10a feed a compartment 17 with treated water, which is a post-decantation compartment, extending longitudinally at the upper portion of the apparatus between the axial central collecting gutter 11 and a partition C parallel to the gutter. The compartment 17 is provided with lamellar modules 18. An aperture 19 is operative for retaining the slurries in one of the cells, the treated water flowing out via gutters 20.

The operation of the apparatus is as follows:

Cells 1 and 1a function alternately as a fermentation cell and as a decantation cell. For the purpose of the description, tank 1 is referred to herein as the fermentation cell and tank 1a, the decantation cell. Valve 6 is opened, valve 6a is closed. The water to be treated flows into cell 1 via duct 5, at a low speed, preferably less than or equal to 0.10 m/s, with a flow rate $Q_4$. The stirring gas insufflating blowpipes 14 are actuated, while blowpipes 14a are at rest. The gas-lift transfer device 7a is operating while device 7 is at rest.

The gas-lift device 7a feeds with a constant flow rate cell 1a from cell 1, with a flow rate $Q_T$ greater than flow rate $Q_4$. The slurries decant in cell 1a and are recycled by the balancing conduit 9 according to a flow rate $Q_T - Q_4$. The deposits of slurries in the cell where the decantation takes place are immediately set back in suspension in said cell at the moment where it becomes a fermentation cell. The cells can be given any shape.

The gas-lift transfer system also provides a simultaneous pumping effect on the transit flow rate from the fermentor to the decantation vessel and on the natural recycling flow rate of the slurries to the fermentor in addition to a degassing effect and possibly a ventilation effect on the transferred slurry, by means of shaft 8a. As a result, methanization and thereby causing a better separation of the slurry.

Figure 2:
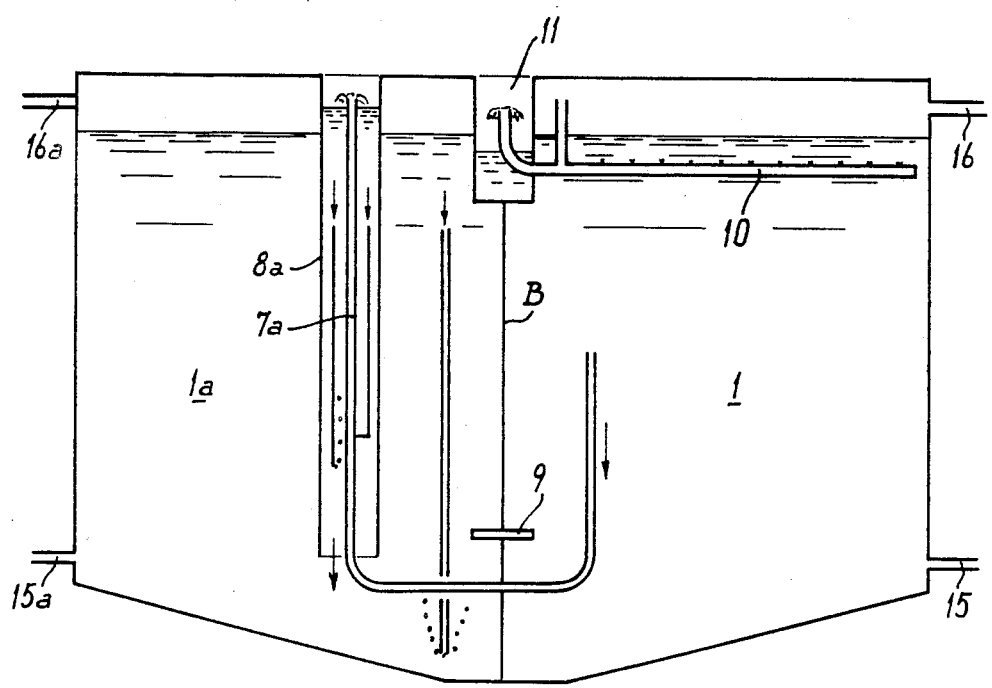
FIGS. 2 and 3 are sectional schematic views of two embodiments according to the invention.

The decanted water is recovered by manifold 10a and, in the embodiment shown in FIG. 2, sent to the central gutter 11 or, in the embodiment shown in FIG. 3, to the post-decantation compartment 17 from which the treated water is discharged by the side gutters 20. The lamellar post-decantation compartment provides for a complementary separation and avoids the draining system 13 discussed, being operational for the draining of manifold 10a when the cycle is being reversed. The separated slurry easily returns by gravity in cell 1 through aperture 19 which opens in one of the cells. In this case, the transfer gas-lift systems being adapted to be adjusted differently in each cell according to whether aperture 19 opens into it or not, so as to make up for any unbalance thus created.

As the cycle proceeds, the slurries build up in cell 1a and the duration of the cycle, which lasts from 2 hours to 3 days, is set as a function of the evolution of the weight of slurries in dry matter in cells 1 and 1a.

This evolution is monitored in known manner by weight measurements of dry matter at the beginning and at the end of the cycle in cells 1 and 1a and by measurements of volatile acids and of the production of gas or of the weight of material in suspension in the treated water.

Prior to cycle inversion, the stirring effect caused by blowpipes 14 can be stopped during 1 to 3 hours to prevent any slurry from being entrained by the recovery manifold. Then, when valve 6 being closed, valve 6a is opened, and blowpipes 14a are set in function while the gas-lift device 7, blowpipes 14 and device 7a are stopped. In this mode, cell 1a operates then as a fermentation cell and cell 1 as a decantation cell.

We claim:

1. The apparatus for the anaerobic treatment of waste water comprising:
    (a) a reactor vessel adapted to be closed to the atmosphere and pressurized, and reactor vessel being divided into at least two substantially identical chambers;
    (b) a conduit system comprising a gas-lift transfer in each chamber having two branches communicating between each of said chambers within the reactor vessels thereby adapting each of said chambers to function alternatively and reciprocably as a fermentation chamber and a decantation chamber; and
    (c) a perforated manifold disposed within each of said chambers and opening into a central gutter for collecting treated water connected to a draining system.

2. The apparatus according to claim 1, wherein another of said branches of said gas-lift transfer device is provided with a ventilation shaft.

3. The apparatus according to claim 1, wherein said conduit system includes means for recycling slurries from one of said chambers to another of said chambers.

4. The apparatus according to claim 1, comprising a compartment fitted with lamellae for decantation of water being treated in the apparatus, said compartment extending longitudinally between two of said chambers at an upper portion of the apparatus and being selectively in communication with one or the other of the chambers functioning as a decantation chamber.

5. The apparatus according to claim 4 comprising an aperture communicating between the compartment and one or the other of the chambers for permitting slurries separated in said compartment to flow into the chamber functioning as a decantation chamber.

6. The apparatus according to claim 1, wherein each said gas-lift transfer device is adjustable so as to vary the flow of slurries being transferred.

7. The apparatus according to claim 1 wherein said draining system includes a pump positioned in said central gutter.

8. The apparatus according to claim 1 wherein said draining system includes a gas-lift.

* * * * *